March 4, 1969  F. WÖSSNER  3,430,512
CLUTCH ACTUATING MECHANISM
Filed April 28, 1967  Sheet 2 of 2

INVENTOR
Felix Wössner
BY Low and Berman
Attys

United States Patent Office 3,430,512
Patented Mar. 4, 1969

3,430,512
CLUTCH ACTUATING MECHANISM
Felix Wössner, Schweinfurt am Main, Germany, assignor to Fichtel & Sachs A.G., Schweinfurt am Main, Germany
Filed Apr. 28, 1967, Ser. No. 634,596
Claims priority, application Germany, May 14, 1966, F 49,210
U.S. Cl. 74—512    8 Claims
Int. Cl. G05g 1/14

ABSTRACT OF THE DISCLOSURE

A pneumatic or hydropneumatic auxiliary spring is interposed between the pedal lever of a clutch actuating mechanism and the supporting car body in such a manner that the spring initially slightly resist clutch disengaging movement of the lever, but thereafter assists such movement with a torque which increases with displacement of the lever from its normal inoperative position. A valved throttling passage in a piston of the spring prevents sudden clutch engagement.

*Background of the invention*

This invention relates to clutch actuating mechanisms of the type employed in automotive vehicles and the like, and particularly to improvements in an auxiliary spring used for facilitating clutch operation.

More specifically, the invention is concerned with improvements in the clutch actuating mechanism disclosed in German Patent No. 944,050. The known mechanism is equipped with a helical spring connected to the clutch pedal lever by a multi-member linkage in such a manner that the spring initially resists movement of the lever from the clutch-engaging to the clutch-disengaging position, but assists such movement upon continued angular displacement of the lever.

Unless the helical spring is quite long, the spring force varies greatly with extension of the spring and reaches a minimum when the angular displacement of the pedal lever from the clutch-engaging position and the resistance offered by the clutch return springs is greatest. A relatively complex linkage is required in the known device between the spring and the pedal lever to hold the dimensions of the apparatus within limits compatible with the cramped space under the dashboard of a motorcar, and still to provide adequate auxiliary spring action in the fully disengaged position of the clutch.

*Summary of the invention*

It has been found that a clutch actuating mechanism of the afore-described type can be greatly simplified, made more compact, and yet more effective and reliable when the helical spring of the known apparatus is replaced by a pneumatic or hydropneumatic auxiliary spring in which a rod member is partly received in sealing engagement in a cylinder member and partly projects therefrom, and a gas under pressure in the cylinder member urges the rod member outward of the cylinder member, these members being secured respectively to the car body which supports the clutch actuating mechanism and to the clutch pedal lever.

Even a very small auxiliary spring of the invention provides substantially uniform spring force over its normal range of extension, and thus does not require a complex linkage for connection to the pedal lever. It is simplest hingedly to attach the rod member to the car body while hingedly attaching the cylinder member of the spring to one arm of a two-armed pedal lever. The reversal of the spring torque during angular displacement of the pedal lever is brought about in a very convenient manner if trunnions projecting from the cylinder member in opposite radial directions at the axial end of the cylinder member from which the rod member projects engage openings in the two free ends of the lever arm which is bifurcated and which receives the cylinder member between the free ends.

The common axis of the trunnions and the pivot which secures the rod member to the supporting car body may thus be closely spaced, whereby a small angular displacement of the pedal lever may cause a sharp change in the torque exerted by the auxiliary spring on the lever, and a reversal in the direction of the torque in a manner most advantageous in a clutch mechanism of the type discussed here.

The pneumatic or hydropneumatic spring of the invention can readily be equipped with a throttling piston which does not impede rapid disengagement of the clutch but prevents sudden engagement.

Other features and many of the attendant advantages of the invention will be readily appreciated as the same becomes better understood by reference to the following detailed description of preferred embodiments when considered in connection with the accompanying drawing.

*Descripiton of the prefered embodiment*

Figure 1:
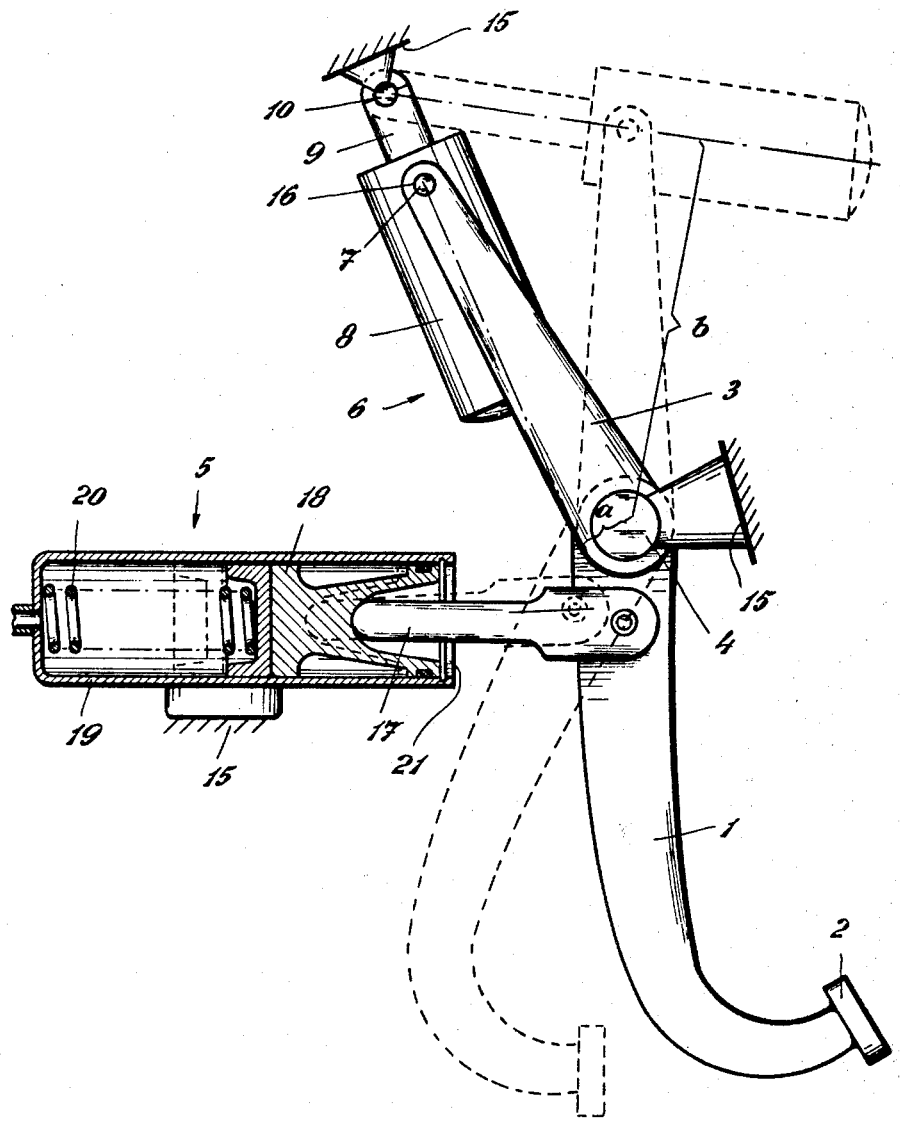
FIG. 1 shows a clutch actuating mechanism of the invention in side elevation, and partly in section.
Figure 2:
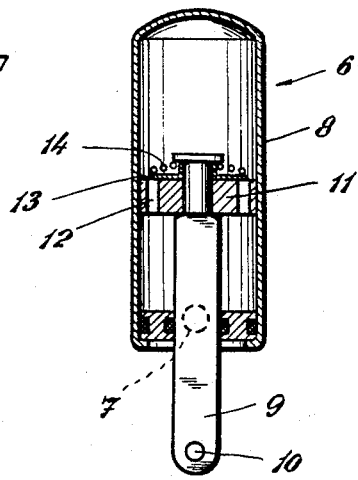
FIG. 2 shows an auxiliary spring of the mechanism of FIG. 1 in elevational section.

Referring now to the drawing in detail, and initially to FIGS. 1 and 2, there are seen the clutch pedal assembly of an otherwise conventional motorcar and associated elements of the clutch mechanism, the clutch pedal assembly mainly consisting of a two-armed lever 1 pivotally mounted on the supporting car frame 15 by means of a horizontal pivot pin 4. The free end of one arm of the lever 1 carries a pedal plate 2, and the other arm 3 is bifurcated.

The cylinder 8 of an auxiliary pneumatic spring 6 is mounted between the two ends 16 of the arm 3 by means of radial trunnions 7 provided near one axial end of the cylinder 8 from which a heavy cylindrical piston rod 9 projects in an axial direction. A pivot 10 secures the free end of the rod 9 to the car body 15 while the inner end of the piston rod is attached to a piston 11 in the cylinder 8. Axial bores 12 in the piston connect the compartments of the cylinder 8 on opposite axial sides of the piston 11 and are normally partly obstructed by a valve plate 13 on the face of the piston directed away from the rod 9 under the pressure of a spiral spring 14. The cylinder 8 is filled with compressed air.

A hinge on the first-mentioned arm of the lever 1 near the pivot pin 4 secures a push rod 17 to the clutch pedal lever. The rod 17 abuttingly engages the piston 18 of a conventional hydraulic clutch linkage 5. The piston 18 is received in a cylinder 19, and a return spring 20 in the cylinder tends to pivot the lever 1 counterclockwise, as viewed in FIG. 1, toward the position shown in fully drawn lines in which the piston 18 is stopped by a ring 21 in the cylinder 19. The clutch is connected to the piston 18 in a conventional manner, not show.

The pedal is held in the fully drawn position by gravtiy and the pneumatic spring 6. The compressed air in the spring 6 tends to move the piston rod 9 outward of the cylinder 8. The resulting pressure of the trunnions 7 on the lever arm 3 produces a force whose vector coincides with the axis of the cylinder 8 and is offset from the axis of the pivot pin 4 by a small distance $a$, and which therefore tends to turn the lever 1 counter-clockwise from the position illustrated in fully drawn lines in FIG. 1. The clutch is engaged.

When the pedal plate 2 is depressed by the foot of the driver toward the clutch-disengaging position shown in broken lines, the lever 1 is swung clockwise, whereby the distance $a$ is quickly reduced to zero. The initially small resistance of the spring 6 to movement of the clutch pedal thereby becomes even smaller as the resistance of the return spring 20 is gradually increased. When the axis of the cylinder 8 passes the axis of the pivot pin 4 during movement of the auxiliary spring 6 toward the position shown in broken lines, the force of the pneumatic spring 6 counteracts that of the return spring 20 and assists the foot pressure of the driver in disengaging the clutch. The clutch disengaging effect of the spring 6 increases with the distance $b$ of the axis of the cylinder 8 from the axis of the pivot pin 4.

While the pneumatic spring is swung from the fully drawn position to that illustrated in broken lines, the piston rod 9 is moved outward of the cylinder 8, the air in the cylinder expands and flows through the bores 12 in a direction to lift the valve plate 13 against the restraint of the spring 14.

When the driver reduces his foot pressure again to engage the clutch, the return spring 20 overcomes the resistance of the pneumatic spring 6, and the piston rod 9 moves inward of the cylinder while air flows inward of the orifices of the bores 12 which are largely obstructed by the plate 13. Sudden engagement of the clutch is prevented by the throttling effect of the obstructed passages 12, while sudden clutch disengagement is not hindered.

Figure 3:
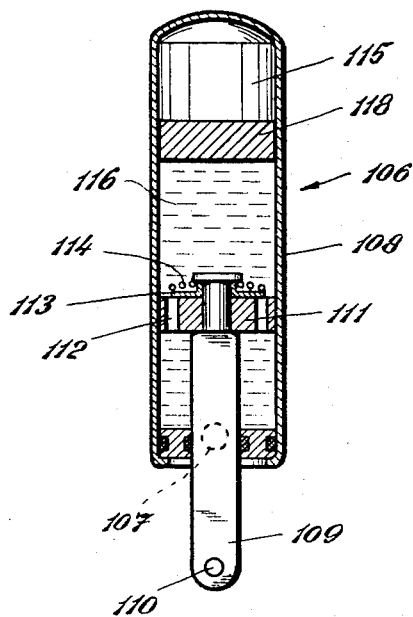
FIG. 3 shows a modification of the spring of FIG. 2 in a corresponding view.

In the hydropneumatic auxiliary spring 106 shown in FIG. 3, a cylinder 108 slidably receives a piston 111 provided with a piston rod 109. The spring 106 may replace the afore-described spring 6, trunnions 107 on the cylinder 108 engaging the ends 16 of the arm 3 while the free end of the piston rod 109 is attached to the vehicle body 15 by a pivot pin 110.

The piston 111 is provided with axial bores 112 whose orifices in a radial piston face are normally partly obstructed by a valve plate 113 under the pressure of a spiral spring 114. The structure described so far is substantially identical with corresponding features of the pneumatic spring 6.

The compartment in the cylinder 108 remote from the piston rod 109 is axially divided by a floating piston 118. The chamber 115 between the piston 118 and the closed end of the cylinder 108 is filled with compressed air or another gas under a pressure higher than atmospheric pressure while the remainder of the cylinder 108 including the bores 112 and the cylinder spaces connected thereby is filled with a liquid 116, such as hydraulic brake fluid.

The hydropneumatic spring 106 operates substantially in the same manner as the pneumatic spring 6. The compressed gas in the chamber 115 tends to drive the piston rod 109 outward of the cylinder 108. The throttling effect of the bores 112 under otherwise constant conditions is a function of the viscosity of the fluid passing therethrough, and is substantially greater when a liquid replaces the gas employed in the spring 6.

The pneumatic or hydropneumatic auxiliary springs 6, 106 are normally supplied by the manufacturer with their fluid contents under pressure and ready for use. It will be appreciated that the cylinders 8, 108 may be equipped with filling nipples in a conventional manner for replenishing fluids after leakage losses.

While the invention has been described with reference to a clutch actuating mechanism connected to the non-illustrated clutch by a hydraulic linkage, the apparatus of the invention is equally applicable to mechanical clutch linkages in an obvious manner. The clutch pedal lever may be biased toward the position shown in fully drawn lines in FIG. 1 by one or more springs in the clutch itself, and the return spring 20 is not a necessary element of the clutch actuating mechanism.

It should be understood, therefore, that the foregoing disclosure relates only to preferred embodiments of the invention and that it is intended to cover all changes and modifications of the examples of the invention chosen herein for the purpose of the disclosure which do not constitute departures from the spirit and scope of the invention set forth in the appended claims.

What is claimed is:

1. In a clutch actuating mechanism for an automotive vehicle and the like having a support, a clutch pedal lever pivotally mounted on said support, and an auxiliary spring connected to said lever for exerting torque on the same, the direction and magnitude of said torque varying in response to the angular position of said lever on said support, the improvement in the auxiliary spring which comprises:
   (a) a cylinder member;
   (b) a rod member partly received in sealing engagement in said cylinder member and partly projecting therefrom; and
   (c) a gas under pressure in said cylinder member,
      (1) said gas urging said rod member outward of said cylinder member, and
      (2) one of said members being secured to said support and the other member to said lever.

2. In a mechanism as set forth in claim 1, said rod member being hingedly secured to said support, and said cylinder member being hingedly secured to said lever member.

3. In a mechanism as set forth in claim 2, said lever having two arms, one of said arms being secured to said cylinder member, and a pedal plate on the other arm.

4. In a mechanism as set forth in claim 3, said cylinder member having an axis, two trunnions projecting from said cylinder member in opposite radial directions, said one arm being bifurcated and having two free ends, said cylinder member being received between said free ends, said trunnions rotatably engaging respective openings in said free ends.

5. In a mechanism as set forth in claim 4, said rod member axially projecting from one axial end portion of said cylinder member, and said trunnions radially projecting from said one axial end portion.

6. In a mechanism as set forth in claim 5, said cylinder being formed with a cavity therein, a piston member fixedly fastened to said rod member and axially dividing said cavity into two compartments, said piston member being formed with an axial bore therethrough connecting said compartments, and valve means on said piston member impeding flow of said gas through said bore in one axial direction only.

7. In a mechanism as set forth in claim 6, said piston member having a face transverse of said axis, said bore having an orifice in said face, and said valve means including a plate member on said face and a spring biasing said plate member toward a position in which the plate member partly obstructs said orifice.

8. In a mechanism as set forth in claim 1, connecting means hingedly connecting said cylinder member to said lever, and fastening means pivotally fastening said rod member and said lever to said support for joint movement between first and second angular positions of the rod member and the lever relative to said support, said auxiliary spring in said first position urging said lever to turn on said support in a first direction, and said auxiliary spring in said second position urging said lever to turn on said support in a second direction opposite to said first direction.

References Cited

UNITED STATES PATENTS

| | | | |
|---|---|---|---|
| 3,014,381 | 12/1961 | Frank | 74—512 |
| 3,199,367 | 8/1965 | Zetye | 74—512 |
| 3,302,763 | 2/1967 | Wobrock | 74—512 XR |

FRED C. MATTERN, JR., *Primary Examiner.*

J. A. WONG, *Assistant Examiner.*

U.S. Cl. X.R.

74—516